US 6,576,356 B1

United States Patent
Hallum

(10) Patent No.: US 6,576,356 B1
(45) Date of Patent: Jun. 10, 2003

(54) PRECONDITIONING MEMBRANES OF A FUEL CELL STACK

(75) Inventor: Ryan Hallum, Latham, NY (US)

(73) Assignee: Plug Power Inc., Latham, NY (US)

( * ) Notice: Subject to any disclaimer, the term of this patent is extended or adjusted under 35 U.S.C. 154(b) by 65 days.

(21) Appl. No.: 09/694,768

(22) Filed: Oct. 23, 2000

(51) Int. Cl.$^7$ ................................................. H01M 8/00
(52) U.S. Cl. ........................... 429/13; 429/12; 29/623.1
(58) Field of Search .......................... 29/623.1; 429/13, 429/12

(56) References Cited

U.S. PATENT DOCUMENTS 6,372,373 B1 * 4/2002 Gyoten et al. ................ 429/35

FOREIGN PATENT DOCUMENTS

| JP | 358163182 A | * | 9/1983 | ............ H01M/8/04 |
| JP | 404010360 A | * | 1/1992 | ............ H01M/8/04 |
| JP | 405129022 A | * | 5/1993 | ............ H01M/4/88 |
| JP | 408078036 A | * | 3/1996 | ............ H01M/8/04 |

* cited by examiner

Primary Examiner—Patrick Ryan
Assistant Examiner—Angela J Martin
(74) Attorney, Agent, or Firm—Trop, Pruner & Hu, P.C.

(57) ABSTRACT

A preconditioning technique is disclosed to reduce the time that is needed to incubate membranes of a fuel cell stack. In this manner, the technique includes providing gas flows to an anode region and a cathode region of the fuel cell during a preconditioning time interval without causing electrochemical reactions to occur in the fuel cell. Subsequently, during an incubation time interval, electrochemical reactions occur in the fuel cell to incubate the membranes.

18 Claims, 3 Drawing Sheets

PRECONDITIONING MEMBRANES OF A FUEL CELL STACK

BACKGROUND

The invention generally relates to preconditioning membranes of a fuel cell stack.

A fuel cell is an electrochemical device that converts chemical energy produced by a reaction directly into electrical energy. For example, one type of fuel cell includes a proton exchange membrane (PEM), often called a polymer electrolyte membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

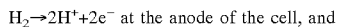

$H_2 \rightarrow 2H^+ + 2e^-$ at the anode of the cell, and

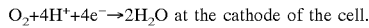

$O_2 + 4H^+ + 4e^- \rightarrow 2H_2O$ at the cathode of the cell.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide a larger amount of power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM. The PEM and its adjacent pair are often assembled together in an arrangement called a membrane electrode assembly (MEA).

The membranes of a newly assembled fuel cell stack typically are cycled through an incubation period, a period of stack operation to "break-in" the membranes. Until the membranes are broken in, the terminal voltage of the stack gradually rises over time before the terminal voltage stabilizes near a generally constant voltage level to mark the end of the incubation period. Among the possible theories to explain why the incubation period is needed, the membranes may include catalyst residue that, until removed during the incubation period, hinders the performance of the membranes. Another theory is that the membranes are initially dry, a condition that hinders the performance of the stack until the membranes hydrate during the incubation period.

Referring to FIG. 1, during a typical incubation period (represented by a time interval called $T_{INC}$ in FIG. 1), a load is placed on the stack, and humidified oxidant and fuel flows are provided to the stack to produce a terminal voltage (called $V_{TERM}$ in FIG. 1). As the incubation period elapses, the $V_{TERM}$ terminal voltage gradually rises. During the incubation period, the load may be varied or may be kept constant. Eventually, the rate at which the $V_{TERM}$ voltage changes decreases, and the $V_{TERM}$ voltage stays near a relatively constant voltage level (called $V_I$ in FIG. 1), thereby marking the end of the incubation period and the beginning of the useful life of the stack. It is noted that the $V_{TERM}$ voltage may gradually decrease away from the $V_I$ voltage level over the lifetime of the stack.

The incubation period may take approximately two to four hours, a time interval that is a significant component of the overall time that is needed to manufacture the fuel cell system. Thus, the incubation period may have a significant impact on the overall cost of the fuel cell system. Therefore, there is a continuing need for an arrangement and/or technique to reduce the time needed to incubate the membranes of the fuel cell stack.

SUMMARY

In an embodiment of the invention, a technique is used to reduce the time that is needed to incubate a membrane of a fuel cell. The technique includes providing gas flows to an anode region and a cathode region of the fuel cell during a first time interval without causing electrochemical reactions to occur in the fuel cell. Subsequently, during a second time interval, the technique includes causing electrochemical reactions to occur in the fuel cell to incubate the membrane.

Advantages and other features of the invention will become apparent from the following description, from the drawing and from the claims.

DETAILED DESCRIPTION

Figure 1:
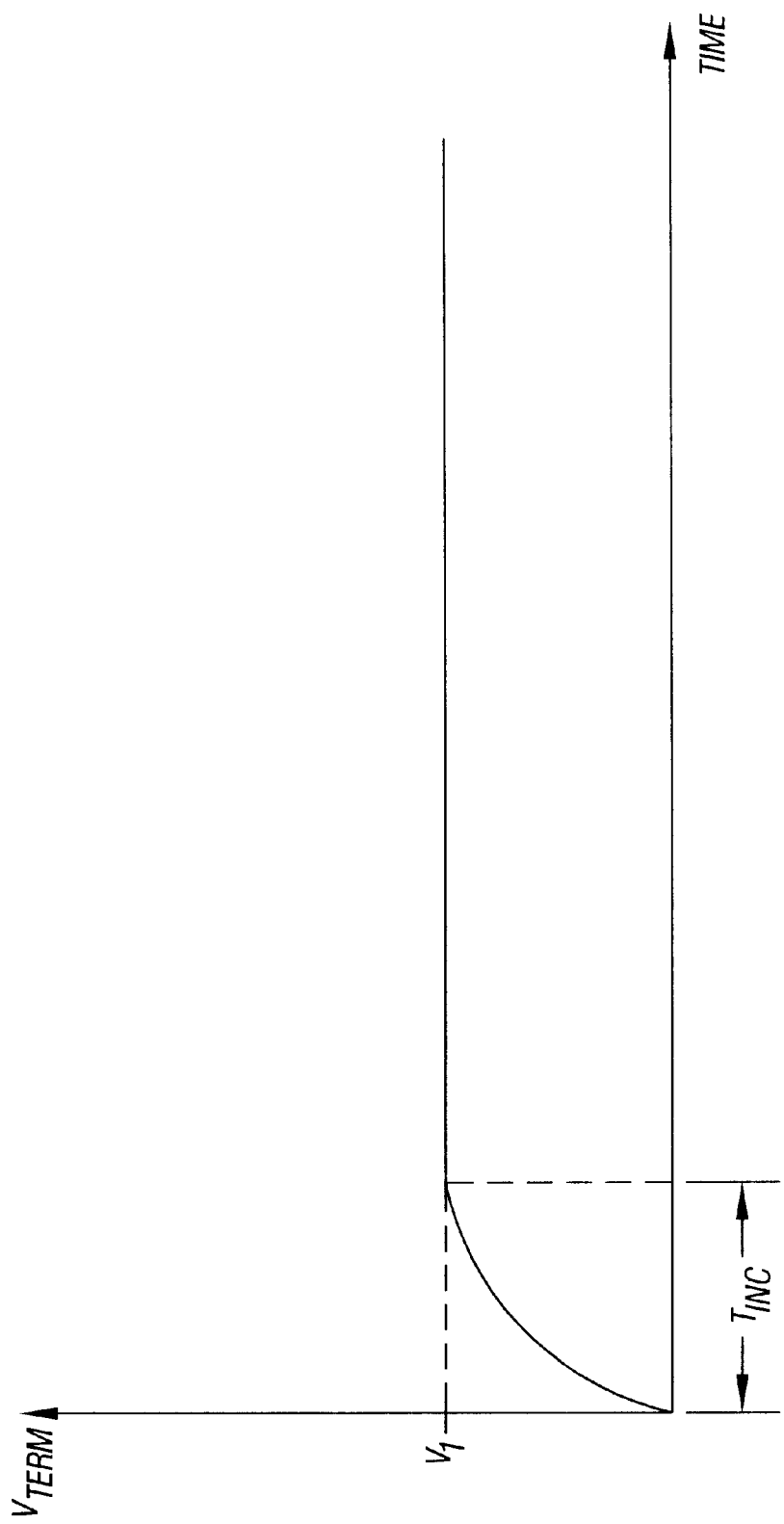
FIG. 1 is a waveform of a terminal voltage of a fuel cell stack over time according to the prior art.
Figure 2:
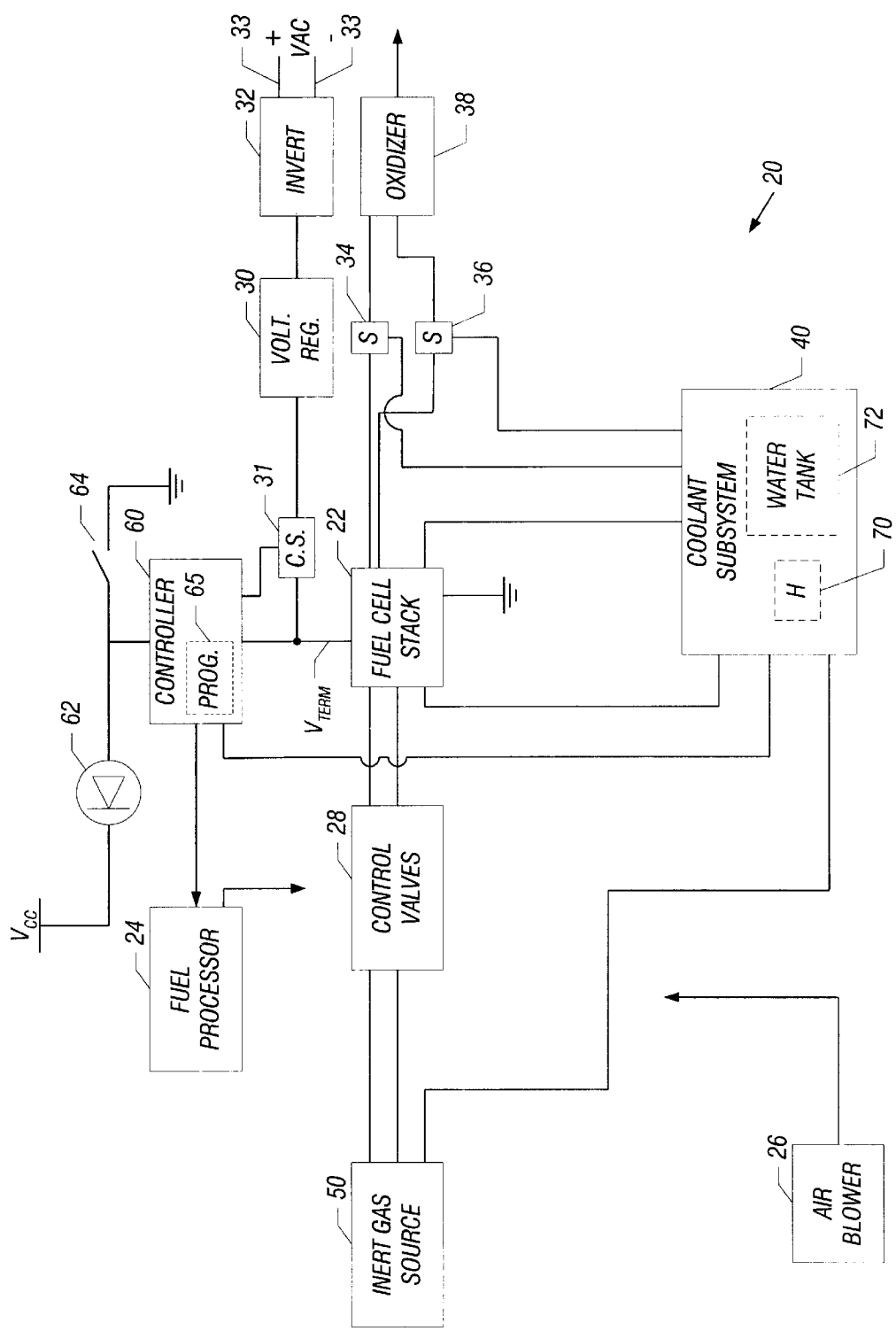
FIG. 2 is a schematic diagram of a fuel cell system according to an embodiment of the invention.

Referring to FIG. 2, an embodiment of a fuel cell system 20 in accordance with the invention includes a fuel cell stack 22 that is capable of producing power (for a residential load, for example) in response to fuel and oxidant flows that are provided by a fuel processor 24 and an air blower 26, respectively. However, before the fuel cell stack 22 is used to produce electricity for a particular application, the membranes of the fuel cell stack 22 are first incubated during an incubation time interval, or period. In accordance with an embodiment of the invention, for purposes of decreasing the time needed for incubation, a preconditioning technique precedes the incubation period, as further described below.

More particularly, during a preconditioning time interval, or period, an inert gas source 50 provides an inert gas to the stack 22 that flows through the anode and cathode regions of the stack 22. Unlike the gas flows (i.e., the fuel and oxidant flows) that are furnished to the stack 22 during the incubation period, the gas flows that are routed through the stack 22 during the preconditioning period do not produce electrochemical reactions in the fuel cells. Thus, the gas flows may be formed from the same gas or different gases that when furnished to the anodes and cathodes of the fuel cells do not cause electrochemical reactions to occur in the fuel cells. In some embodiments of the invention, the duration of the preconditioning time interval is fixed and is not dependent on any stack parameters (a stack voltage, for example), although in other embodiments of the invention, the duration may be a function of one or more stack parameters.

In the context of this application, the "anode regions" of the stack 22 includes the regions of the stack 22 associated with the anodes of the fuel cells and includes the flow channels that route a fuel flow to the anodes of the fuel cells when electrochemical reactions occur in the stack 22 during incubation or post-incubation operation of the stack 22. Similarly, the "cathode regions" of the stack 22 includes the regions of the stack 22 associated with the cathodes of the fuel cells and includes the flow channels that route an oxidant flow to the cathodes of the fuel cells when electrochemical reactions occur in the stack 22 during incubation or post-incubation operation of the stack 22.

It has been discovered that the preconditioning technique that is described herein significantly reduces the duration of the incubation period so that the summation of the preconditioning and incubation periods is significantly less that the duration of the incubation period when preconditioning is not used. For example, tests have been performed in which the preconditioning period was set to one half hour. In these tests, after the end of the preconditioning period, the incubation of the membranes of the stack 22 began during an incubation period, a period in which the stack 22 received oxidant and fuel flows and a terminal voltage (called $V_{TERM}$ in FIG. 2) of the stack 22 rose to a relatively constant voltage level. For these tests, the incubation period was about one half hour. Thus, the summation of the preconditioning and incubation periods was about one hour. As a comparison, the incubation time for the stack 22 without the use of the herein-described preconditioning technique may take two to four hours.

Figure 3:
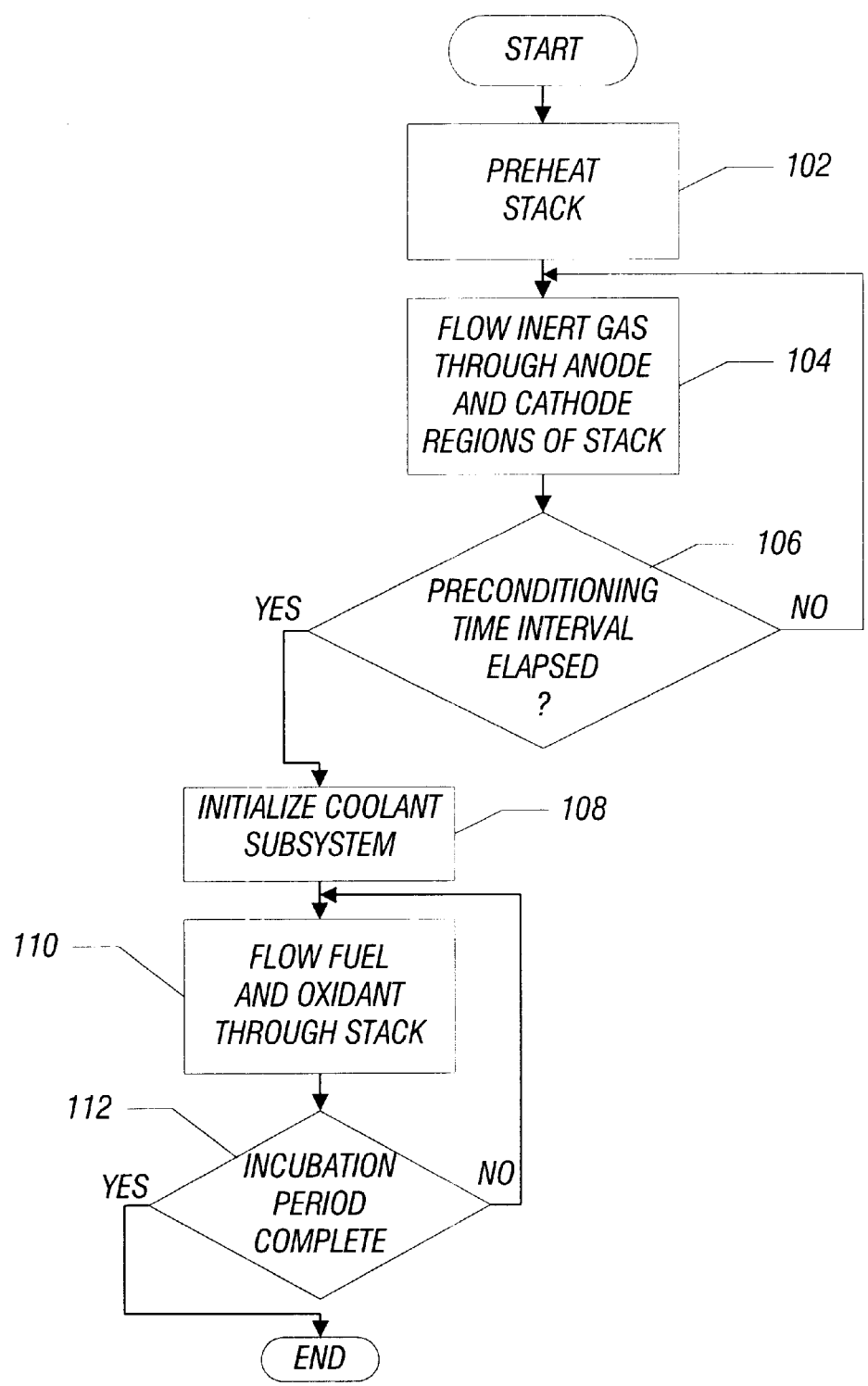
FIG. 3 is a flow diagram depicting a technique to precondition and incubate membranes of a fuel cell stack according to an embodiment of the invention.

As a more specific example, FIG. 3 depicts a technique 100 to both precondition and incubate the membranes of the fuel cell stack 100 according to an embodiment of the invention. The technique 100 includes first preheating (block 102) the stack 22. As an example, a coolant subsystem 40 (see FIG. 2) that is designed to flow a coolant through the stack 22 for purposes of removing heat from the stack 22 during the incubation and post-incubation operation of the stack 22 may also be used to preheat the stack 22. In this manner, the coolant subsystem 40 may include a reservoir, or tank 72, that stores a coolant, such as de-ionized water (as an example), to be circulated through the stack 22. A heater 70 (of the coolant subsystem 40) heats the coolant, and the coolant subsystem 40 circulates the heated coolant through the stack 22 to maintain the temperature of the stack 22 within a predefined range during the preconditioning period. As an example, this temperature may be approximately in the range of 65 to 70° Celsius (C). Other stack temperatures may be used during the preconditioning period.

Still referring to FIG. 3, after the stack 22 is preheated, the technique 100 includes flowing (block 104) an inert gas through the anode and cathode regions of the stack 22. To accomplish this, the inert gas source 50 (see FIG. 2) may be connected through control valves 28 to the oxidant and fuel inlet openings of a manifold (not shown), an arrangement that permits inert gas from the gas source 50 to flow through the anode and cathode regions of the fuel cell stack 22. The inert gas flows may be humidified via water that is injected by the coolant subsystem 40 into the fuel cell stack 22, although other techniques may be used to humidify the gas flows.

As an example, the inert gas that is furnished by the inert gas source 50 may be nitrogen, although other gases may be used, such as air, argon or helium, as just a few examples. It is also possible, in some embodiments of the invention, for the system 20 to include two inert gas sources, one for the anode regions of the stack 22 and one for the cathode regions of the stack 22. However, regardless of the arrangement, the gas or gases that are provided to the stack 22 do not cause electrochemical fuel cell reactions to occur during the preconditioning period.

As a more specific example, in tests that were conducted using a fuel cell stack that was sized to provide approximately seven kilowatts (kW) of power, a single nitrogen gas source (i.e., the inert gas source 50) was used to supply nitrogen gas to the fuel and oxidant manifold inlets of the stack 22. The flow rate of the rate of the nitrogen was set to 240 standard liters per minute, and after a preconditioning period of one half hour, an incubation period of about one half hour was needed to stabilize the $V_{TERM}$ terminal voltage of the stack 22. Other flow rates and times for the preconditioning period may be used.

For purposes of controlling the duration of the preconditioning period, the technique 100 may include monitoring the preconditioning time to determine when the time that is allocated for preconditioning has elapsed, as depicted in diamond 106 of FIG. 3. Upon this occurrence, the technique 100 includes measures to prepare the fuel cell system 20 for the upcoming incubation period. For example, the technique 100 may include initializing (block 108) the coolant subsystem 40 to prepare the coolant subsystem 40 to remove heat from the stack 22 during the incubation period, as electrochemical reactions during the incubation period will produce heat. Other measures to prepare the fuel cell system 20 may include coupling the fuel processor 24 (that provides a fuel flow (a hydrogen flow, for example)) and the air blower 26 (that provides an oxidant flow (an air flow, for example)) to the stack 22 and disconnecting the inert gas source 50 from the stack 22. These connections and disconnections may be performed manually and/or automatically, depending on the particular embodiment of the invention.

Subsequently, the fuel processor 24 and air blower 26 flow fuel and oxidant flows through the stack, as depicted in block 110 of FIG. 3, to begin the electrochemical reactions in the stack 22 and thus, begin the incubation period. Once the incubation period begins, the technique 100 includes determining (diamond 112) when the incubation period is complete. If complete, the technique 100 is terminated. Otherwise, the fuel and oxidant flows continue to flow through the stack 22, as depicted in block 110, as the incubation of the stack 22 continues.

In some embodiments of the invention, during the incubation period, the $V_{TERM}$ terminal voltage of the stack 22 is monitored to determine when the incubation period has elapsed. For example, in some embodiments of the invention, a controller 60 (see FIG. 2) of the system 20 monitors the $V_{TERM}$ voltage to determine when the incubation period is complete. For example, the controller 60 may calculate a rate of change of the $V_{TERM}$ voltage over time, and the controller 60 deems the incubation period to be complete when the rate at which the $V_{TERM}$ voltage changes over time decreases below a predefined rate. The controller 60 may use other techniques to determine when the incubation period has elapsed.

When the controller 60 determines that the incubation period is over, the controller 60 may, in some embodiments of the invention, provide a visual indication of the completion. For example, the controller 60 may indicate the end of the incubation period via one of more light emitting diodes (LEDs) 62 (see FIG. 2).

Referring to FIG. 2, in some embodiments of the invention, the controller 60 may execute a program 65 (stored in a memory of the controller 60, for example) that causes the controller 60 to perform one or more acts of the technique 100. For example, the program 65, when executed, may cause the controller 60 to measure the $V_{TERM}$ voltage, determine the rate at which the $V_{TERM}$ voltage changes over time and recognize when the incubation period is over based on the determined rate of change. The controller 60 may be placed in a mode to control the system 20 during the preconditioning and/or incubation periods via an input interface to the controller 60, such as one or more switches 64 (one switch depicted in FIG. 2), for example. The controller 60 may also, in some embodiments of the invention, set the mode of the coolant subsystem 40 based on whether the incubation, preconditioning or normal operation of the system 20 is occurring.

The controller 60, among its other functions, may control the fuel processor 24 to establish the appropriate stoichiometry for the fuel cell reactions of the stack 22 based on the output power that is being produced by the stack 22. As an example, the controller 60 may monitor the cell voltages of the stack 22 via a voltage monitoring circuit (not shown) and a current sensor 31.

Among other features of the system 20, the system 20 may include a voltage regulator 30 that regulates the $V_{TERM}$ voltage (a DC voltage) that is provided by the stack 22 and converts this voltage into an AC voltage via an inverter 32. As an example, output terminals 33 of the inverter 32 may be coupled to provide power to a house, for example.

The fuel cell system 20 may also include water separators, such as water separators 34 and 36 to recover water from the outlet fuel and oxidant ports of the stack 22. The system 20 may also include an oxidizer 38 to burn fuel from the stack 22 that is not consumed in the fuel cell reactions. As an example, the controller 60 may be a microcontroller or a microprocessor.

Other embodiments are within the scope of the following claims. For example, although a fuel cell system has been described that provides power to a load, a dedicated preconditioning and incubation system may be used to precondition and incubate the membranes. In this manner, this system may include an inert gas source supply gas to the membranes, and a processor programmed with appropriate software to implement the preconditioning and incubation techniques described herein. Other variations are possible.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method usable with a fuel cell, comprising:

providing gas flows to an anode region and a cathode region of the fuel cell during a first time interval without causing electrochemical reactions to occur in the fuel cell; and causing electrochemical reactions to occur in the fuel cell during a subsequent second time interval to incubate a membrane of the fuel cell.

2. The method of claim 1, wherein the providing gas flows comprises:

providing a first gas to the anode region during the first time interval;

providing the first gas to the cathode region during the first time interval.

3. The method of claim 2, wherein the first gas comprises a gas selected from air, argon, helium and nitrogen.

4. The method of claim 2, wherein the first gas comprises nitrogen.

5. The method of claim 1, wherein the providing gas flows comprises:

providing a first gas to the anode region during the first time interval; and providing a second gas that does not react with the first gas to the cathode region during the first time interval.

6. The method of claim 1, further comprising:

humidifying at least one of the gas flows.

7. The method of claim 1, further comprising:

heating the fuel cell to a temperature near a predefined level during the first time interval.

8. The method of claim 1, wherein the providing gas flows reduces the duration of the second time interval.

9. The method of claim 1, wherein the first time interval has a duration of about one half hour.

10. The method of claim 1, wherein the second time interval has a duration of about one half hour.

11. A method usable with a fuel cell stack, comprising:

providing gas flows to an anode region and a cathode region of the fuel cell stack during a first time interval without causing electrochemical reactions to occur in the fuel cell stack; and causing electrochemical reactions to occur in the fuel cell stack during a subsequent second time interval to incubate membranes of the fuel cell stack.

12. The method of claim 11, wherein the providing gas flows comprises:

providing a first gas to a fuel manifold inlet of the stack during the first time interval;

providing the first gas to an oxidant manifold inlet of the stack during the second time interval.

13. The method of claim 12, wherein the first gas comprises a gas selected from air, argon, helium and nitrogen.

14. The method of claim 12, wherein the first gas comprises nitrogen.

15. The method of claim 11, wherein the providing gas flows comprises:

providing a first gas to the fuel manifold inlet of the stack during the first time interval; and providing a second gas that does not react with the first gas to the oxidant manifold inlet of the stack during the first time interval.

16. The method of claim 11, further comprising:

humidifying at least one of the gas flows.

17. The method of claim 11, further comprising:

maintaining a temperature of the fuel cell stack near a predefined level during the first time interval.

18. The method of claim 17, wherein the operating comprises:

operating a coolant subsystem to heat a heat transfer liquid; and circulating the liquid through the stack to maintain the temperature.

* * * * *